Figures 1, 2:
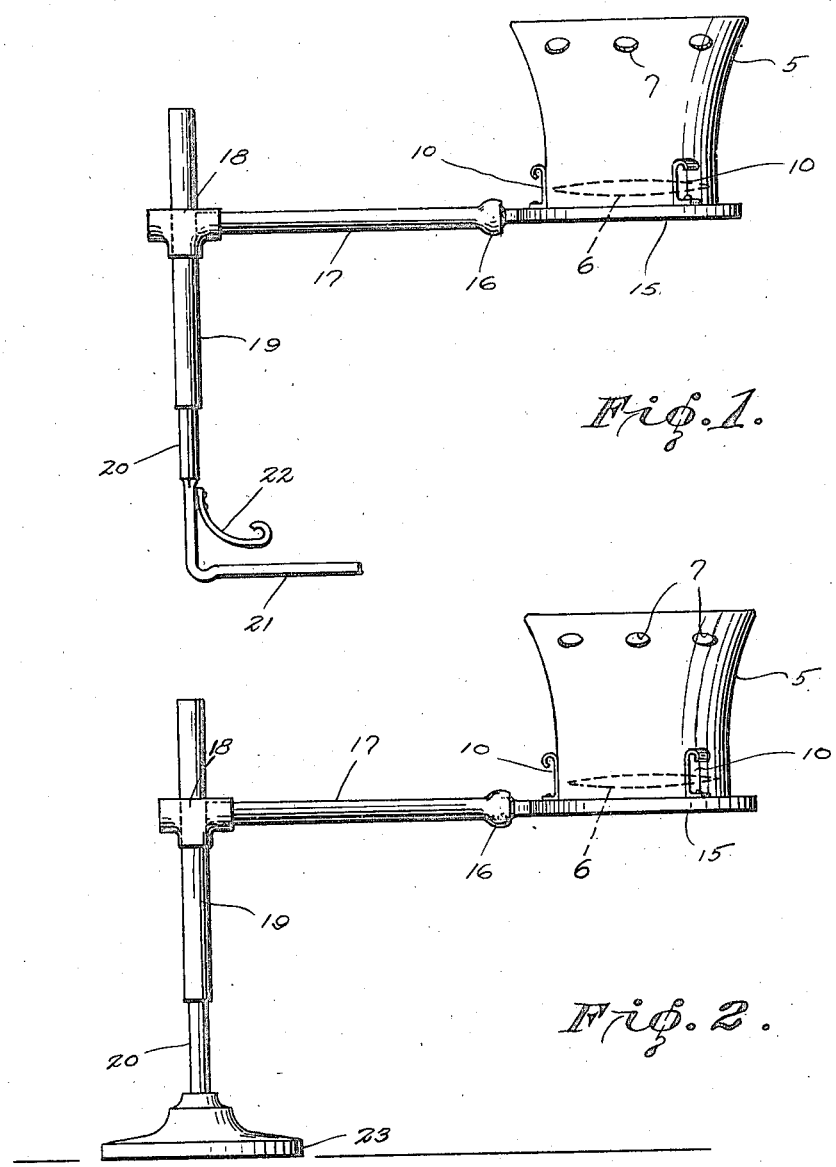

Oct. 30, 1923.

C. V. LARSON 1,472,074

CALIPER READING GLASS

Filed Nov. 23, 1920

Charles V. Larson.
INVENTOR:

BY

ATTORNEYS.

Patented Oct. 30, 1923.

1,472,074

UNITED STATES PATENT OFFICE.

CHARLES V. LARSON, OF CHICAGO, ILLINOIS.

CALIPER-READING GLASS.

Application filed November 23, 1920. Serial No. 426,013.

*To all whom it may concern:*

Be it known that I, CHARLES V. LARSON, a citizen of the United States, residing at Chicago, in the county of Cook and State of Illinois, have invented new and useful Improvements in Caliper-Reading Glasses, of which the following is a specification.

This invention relates to miscroscopes or magnifying glasses, and its object is to provide a device of this kind which is readily applicable to calipers and other implements having graduations which are usually so small and fine as to be rather difficult to read, so that when the device is applied to the implement and the graduations are viewed therethrough they will appear clear and sharp.

The object stated is attained by means of a novel combination and arrangement of parts to be hereinafter described and claimed, and in order that the same may be better understood, reference is had to the accompanying drawing forming a part of this specification.

In the drawing,

Figure 1 is an elevation of the device, and Fig. 2 is a similar view showing a modified structure.

Referring specifically to the drawing, 5 denotes the conical shell of a watchmaker's magnifying glass, in the smaller end of which is mounted the lens 6. The shell 5 has ventilating apertures 7 to prevent fogging of the lens 6.

The smaller end of the shell 5 seats against one side of a metal plate 15 provided with a large opening which is in line with the lens 6, and through which the surface to be viewed is exposed.

The plate 15 has outstanding spring fingers 10 on one side which engage the shell 5 on the outside thereof, and holds the latter attached to the plate.

The plate 15 is connected by a ball-and-socket joint 16 to a horizontal supporting arm 17 which seats in a head 18 on a vertically positioned standard composed of two slidably connected sections 19 and 20, the upper section 19 passing through the head, and being tubular to seat slidably over the lower section 20. The section 20 has laterally extending jaw members 21 and 22, the jaw member 21 serving as a supporting base for the standard composed of slidably connected sections 19 and 20. It will be understood that the device may also be positioned and used by engaging the jaw members 21 and 22 with the beam of a caliper or other implement having a scale of fine graduations.

The structure shown in Fig. 2 does not differ from that shown in Fig. 1 except that the jaw members 21 and 22 are omitted, and the lower standard section 20 is provided with a base or foot piece 23. This structure is designed for supporting the magnifying glass for taking readings or viewing large objects placed beneath the same.

The supporting stands or holders for the magnifying glass shown in Figs. 1 and 2 permit a wide range of adjustment of the glass. The ball-and-socket joint 16 permits angular adjustment of the glass, and the sliding connection of the cross-head 18 with the part 19, and that of the part 19 with the part 20 permits vertical adjustment. It will be understood that the joints are sufficiently tight to hold the parts in adjusted position.

I claim:

The combination with a magnifying glass and its supporting shell, of a supporting plate against which the forward end of the shell seats, said plate having an aperture in line with the shell, means on the plate engageable with the shell for holding the same over the aperture in the plate, a supporting arm to which the plate is swiveled, a supporting standard composed of slidably connected members, a head slidably mounted on one of said members, to which head the inner end of the supporting arm is connected to extend laterally relative to the standard, and supporting means for the standard at the base thereof.

In testimony whereof I affix my signature.

CHARLES V. LARSON.